United States Patent Office 3,066,405
Patented Dec. 4, 1962

3,066,405
FLUX COMPOSITION AND METHOD FOR
SOLDERING ALUMINUM MEMBERS
Edgar G. Eichhorn and Walter D. Finnegan, Spokane, Wash., assignors to Kaiser Aluminum & Chemical Corporation, Oakland, Calif., a corporation of Delaware
No Drawing. Filed May 16, 1960, Ser. No. 29,162
14 Claims. (Cl. 29—495)

This invention relates to soldering fluxes and more particularly to soldering fluxes adapted for use in soldering aluminum and aluminum alloys.

In soldering aluminum and aluminum alloys, the basic difficulty to be overcome is the removal of an oxide film which is formed on the surface of the metal which therefore interferes with a wetting of the underlying metal by the solder. In order to establish a metal to metal contact between the metal being soldered and the solder, the oxide film must be removed either mechanically or chemically. The function of a flux is to serve as a chemical means for removing the oxide film. It is desirable that the flux facilitate solder flow or spreading over the prepared surface.

While it is true that many reaction type fluxes, such as zinc chloride, dissolved in alcohol have been employed in the prior art as principal reaction agents for removal of the oxide film from aluminum, such fluxes nevertheless fail to insure a good flow of solder or to provide a good, protective covering excluding oxygen from the area being soldered. Also, reaction type fluxes must be carefully heated since the rate of volatilization at high temperatures is excessive. Thus, these fluxes are rendered ineffective by direct flame heating and difficult indirect heating methods must be applied with these fluxes. In addition, such fluxes cannot be used satisfactorily on water wet surfaces. Further, copious aluminum trichloride fumes generated during the soldering operation with a reaction type flux present a serious health hazard and require large and costly ventilating equipment. In addition, with prior art fluxes, it is difficult to prepare a soldered surface for resoldering.

This invention relates to a soldering flux comprising a mixture of halide salts which do not form a reaction type flux and which can be used with water as a flux vehicle. The mixture comprises 10 to 40% by weight zinc bromide, 3 to 8% by weight lithium fluoride, 23 to 45% by weight potassium chloride, 17 to 33% by weight lithium chloride, 0 to 22% by weight sodium chloride and a small but effective amount of lead chloride. This flux is suitable for use with a wide temperature range of solders for aluminum and in a preferred embodiment of this invention the soldering is carried out at a temperature ranging from 750° F. to 950° F. For application of this flux it is preferred to make up a paste or slurry by mixing the above dry ingredients with water. The amount of water required will vary with the application and in some applications it may be desirable to have a thick paste, whereas for other applications it may be desirable to have a relatively thin liquid consistency. In any event, it is a simple matter for one skilled in the art of soldering to mix water with the dry ingredients to obtain the desired consistency for the work to be done.

This flux effectively removes the oxide film, has excellent melting and spreading characteristics, may be heated by direct flame heating, is stable at elevated temperatures, is suitable for resoldering operations, such as encountered in the repair of a soldered assembly, and since it employs water as a vehicle it can be used to solder assemblies which have been leak tested in water and are therefore wet at the time the repair of the assemblies is performed. This cannot be done with fluxes using organic solvents as vehicles. Also, with this flux, there is no copious white cloud of aluminum trichloride generated during the soldering operation and only normal ventilation must be provided.

In a preferred embodiment of this invention, the dry mixture is made up of from 34 to 38% by weight of zinc bromide, 5 to 7% by weight of lithium fluoride, 22 to 25% by weight of potassium chloride, 16 to 18% by weight of lithium chloride, 16 to 18% by weight of sodium chloride, and .1 to .3% by weight lead chloride. It is preferred to mix the dry ingredients with water in amounts ranging from about 90 to 300 cubic centimeters of water per 1000 grams of dry ingredients. Specific examples of the dry flux mixture embodying the principles of this invention are given in Table 1 below with amounts being given in parts by weight.

TABLE 1

| Components | I | II | III |
|---|---|---|---|
| Zinc Bromide | 18.5 | 36.0 | 19.1 |
| Lithium Fluoride | 7.4 | 6.0 | 3.8 |
| Potassium Chloride | 29.5 | 23.8 | 44.5 |
| Lithium Chloride | 22.4 | 17.0 | 32.4 |
| Sodium Chloride | 22.0 | 17.0 | |
| Lead Chloride | 0.2 | 0.2 | 0.2 |

The dry ingredients of the fluxes of Table 1 may be mixed with water to provide a paste for liquid consistency most suitable for the desired application.

In one example of the practice of this invention the faying surfaces of three pairs of 1" x 4" x .064" thick strips of commercially pure aluminum were covered with the fluxes having compositions shown in Table 1 above in the form of a water paste. The fluxes were mixed in a proportion of 150 cubic centimeters of water per 1000 grams of dry ingredients. Flux number I was applied to the joining areas of one pair of strips, flux number II was applied to the joining areas of a second pair of strips, while flux number III was applied to the joining areas of the third pair of strips. Each pair of strips to be joined was then mounted in a jig, overlapped ¼", and a wire of a soldering filler alloy of 95% zinc, 5% aluminum, was applied adjacent to the two overlapping metal strips. Each assembly was then heated with a flame from a torch to a temperature of 900° F. as determined by thermocouples mounted on such strips. Each assembly was heated for about 1 minute. Upon completion of the heating operation and cooling to room temperature, it was found that a sound joint had been produced between each pair of strips. A symmetrical fillet of solder metal had been formed on both sides of the joint and the entire flux residue was readily washed away from the newly formed joints. During the heating operation, there was no white cloud of fumes generated and only normal ventilation requirements were necessary.

While the above have been considered to be preferred embodiments of the invention, it will be understood by those skilled in the art that various changes and modifications may be made herein without departing from the spirit and scope thereof as claimed in the appended claims.

What is claimed is:

1. A soldering flux consisting essentially by weight of from about 10 to 40% zinc bromide, 3 to 8% lithium fluoride, 23 to 45% potassium chloride, 17 to 33% lithium chloride, 0 to 22% sodium chloride, and 0.1 to 0.3% lead chloride.

2. A soldering flux consisting essentially by weight of from about 10 to 40% zinc bromide, 3 to 8% lithium fluoride, 23 to 45% potassium chloride, 17 to 33% lithium chloride, 0 to 22% sodium chloride, and 0.1 to 0.3% lead chloride, and mixed with water.

3. The soldering flux of claim 2 wherein the amount of water is sufficient to form a pastelike consistency.

4. The soldering flux of claim 2 wherein the amount of water is sufficient to form a liquid consistency.

5. The soldering flux of claim 2 wherein the proportion of water to dry ingredients ranges from about 90 to 300 cubic centimeters of water per 1000 grams of dry ingredients.

6. A soldering flux consisting essentially by weight of from about 34 to 38% zinc bromide, 5 to 7% lithium fluoride, 22 to 25% potassium chloride, 16 to 18% lithium chloride, 16 to 18% sodium chloride, and 0.1 to 0.3% lead chloride.

7. A soldering flux consisting essentially by weight of from about 34 to 38% zinc bromide, 5 to 7% lithium fluoride, 22 to 25% potassium chloride, 16 to 18% lithium chloride, 16 to 18% sodium chloride, and 0.1 to 0.3% lead chloride mixed with water.

8. The soldering flux of claim 7 wherein the proportion of water to dry ingredients ranges from about 90 to 300 cubic centimeters of water per 1000 grams of dry ingredients.

9. In a method of producing a soldered joint between aluminum members, the use of a soldering flux consisting essentially by weight of from about 10 to 40% zinc bromide, 3 to 8% lithium fluoride, 23 to 45% potassium chloride, 17 to 33% lithium chloride, 0 to 22% sodium chloride, and 0.1 to 0.3% lead chloride and heating to a temperature of not less than about 750° F.

10. A method of producing a soldered joint between aluminum members comprising effecting the soldering in the presence of a flux consisting essentially by weight of from about 10 to 40% zinc bromide, 3 to 8% lithium fluoride, 23 to 45% potassium chloride, 17 to 33% lithium chloride, 0 to 22% sodium chloride, and 0.1 to 0.3% lead chloride, and mixed with water and at a temperature of not less than 750° F.

11. A method of producing a soldered joint between aluminum members comprising the steps of applying a flux consisting essentially by weight of from about 10 to 40% zinc bromide, 3 to 8% lithium fluoride, 23 to 45% potassium fluoride, 17 to 33% lithium chloride, 0 to 22% sodium chloride, and 0.1 to 0.3% lead chloride mixed with water to the portion of said members that are to be joined, applying a soldering filling alloy and soldering said members by heating to a temperature of not less than about 750° F.

12. The method of claim 11 wherein said members are heated to a temperature of from about 750 to 950° F.

13. The method of claim 12 wherein the amount of water in said flux is sufficient to form a pastelike consistency.

14. The method of claim 12 wherein the amount of water in said flux is sufficient to form a liquid consistency.

References Cited in the file of this patent

UNITED STATES PATENTS

| | | |
|---|---|---|
| 2,706,161 | Westby | Apr. 12, 1955 |
| 2,867,037 | Lawton | Jan. 6, 1959 |

FOREIGN PATENTS

| | | |
|---|---|---|
| 413,141 | Great Britain | July 12, 1934 |